United States Patent
Haam et al.

(10) Patent No.: US 10,144,806 B2
(45) Date of Patent: Dec. 4, 2018

(54) POLYANILINE COORDINATED WITH TRANSITION METAL AND PREPARATION METHOD THEREOF

(71) Applicant: University-Industry Foundation, Yonsei University, Seoul (KR)

(72) Inventors: Seungjoo Haam, Seoul (KR); Yong-min Huh, Seoul (KR); Jaemoon Yang, Seoul (KR); Jihye Choi, Incheon (KR); Eun Bi Choi, Seoul (KR); Seo Ryung Bae, Seoul (KR); Byunghoon Kang, Seoul (KR); Myeong-Hoon Kim, Seoul (KR); Yoochan Hong, Seoul (KR); Hyun-Ouk Kim, Seoul (KR)

(73) Assignee: University-Industry Foundation, Yonsei University, Seoul (KR)

( * ) Notice: Subject to any disclaimer, the term of this patent is extended or adjusted under 35 U.S.C. 154(b) by 243 days.

(21) Appl. No.: 14/636,429

(22) Filed: Mar. 3, 2015

(65) Prior Publication Data
US 2016/0200873 A1    Jul. 14, 2016

(30) Foreign Application Priority Data
Mar. 4, 2014    (KR) .......................... 10-2014-0025665

(51) Int. Cl.
*H01B 1/12*    (2006.01)
*C08G 73/02*    (2006.01)
(Continued)

(52) U.S. Cl.
CPC ............ *C08G 73/0266* (2013.01); *C08K 3/22* (2013.01); *C08K 3/36* (2013.01); *C08L 79/02* (2013.01);
(Continued)

(58) Field of Classification Search
CPC ....................................................... H01B 1/12
See application file for complete search history.

(56) References Cited

U.S. PATENT DOCUMENTS 6,010,645 A    1/2000 Angelopoulos et al.
6,303,671 B1 *  10/2001 Cottevieille ....... C08G 73/0266
                                                            523/137

(Continued)

OTHER PUBLICATIONS

Zhongwei Niu, et al, Polyaniline-Silica Composite Conductive Capsules and Hollow Spheres, Advanced Functional Materials, 2003, 13, No. 12, pp. 949-954.*

(Continued)

*Primary Examiner* — William D Young
(74) *Attorney, Agent, or Firm* — Hammer & Associates, P.C.

(57) ABSTRACT

Provided are polyaniline coordinated with a transition metal, a core-shell nanoparticle including the same as a core, and preparation methods thereof. According to the polyaniline coordinated with a transition metal and the nanoparticle of the present application, it is possible to prepare polyaniline coordinated with a transition metal using an oxidizing agent having a core-shell structure and including the transition metal and a nanoparticle including the same as a core. The polyaniline prepared as such is in a doped state, and, thus, a preparation process is simple. Further, dispersibility with respect to a solvent is improved, and a band gap level of the polyaniline can be easily regulated.

3 Claims, 5 Drawing Sheets

(51) Int. Cl.
*C08K 3/22* (2006.01)
*C08K 3/36* (2006.01)
*C08L 79/02* (2006.01)
*B82Y 40/00* (2011.01)
*B82Y 30/00* (2011.01)

(52) U.S. Cl.
CPC .............. *H01B 1/128* (2013.01); *B82Y 30/00* (2013.01); *B82Y 40/00* (2013.01); *C08K 2003/2262* (2013.01); *C08K 2003/2265* (2013.01)

(56) References Cited

U.S. PATENT DOCUMENTS

| | | | |
|---|---|---|---|
| 6,632,380 B1 * | 10/2003 | Wessling | C08F 8/42 252/500 |
| 2011/0031450 A1 * | 2/2011 | Park | B22F 1/0018 252/513 |

OTHER PUBLICATIONS

Li, J., et al, "Synthesis and thermoelectric properties of hydrochloric acid-doped polyaniline," Synthetic Metals, 160 (2010) 1153-1158.*
Korean Patent Office, Office Action dated Aug. 5, 2015 against the corresponding Korean Application No. 10-2014-0025665. No translation.
Smertenko, P.S. et al., "Doping of polyaniline by transition metal salts: current-voltage characteristics of the ITO/polymer film/metal heterostructures," Synthetic Metals, Elsevier, 146 (2004) 187-196.
Dimitriev, O.P. et al., "Polyaniline-transition metal salt complexes: insight into formation mechanisms," Synthetic Metals, Elsevier, 149 (2005) 187-192.
Macdiarmid, et al, "Polyaniline: A New Concept in Conducting Polymers," Synthetic Metals, Elsevier Sequoia (The Netherlands) 1987, p. 285-290.

* cited by examiner

POLYANILINE COORDINATED WITH TRANSITION METAL AND PREPARATION METHOD THEREOF

CROSS-REFERENCE TO RELATED APPLICATION

This application claims priority to and the benefit of Korean Patent Application No. 10-2014-0025665, filed on Mar. 4, 2014, the disclosure of which is incorporated herein by reference in its entirety.

BACKGROUND

1. Field of the Invention

The present application relates to polyaniline coordinated with a transition metal and a preparation method thereof, and more particularly, to polyaniline which is coordinated with a transition metal and can be regulated in a band gap energy level, a core-shell nanoparticle including the same as a core, and preparation methods thereof.

2. Discussion of Related Art

Polyaniline has been applied to anti-corrosion materials, antistatic materials, static discharge materials, electro-magnetic interference (EMI) shielding materials, electrochromic devices, battery electrodes, semiconductors, or solar cells, and can be utilized in more various applications by improving its electrical conductivity.

Generally, polyaniline can be prepared according to roughly two methods, i.e., an electrochemical method and a chemical oxidation method that uses an oxidation-reduction reaction or an acid/base reaction. However, the chemical oxidation method is suitable for commercially producing polyaniline.

A representative chemical oxidation method for preparing polyaniline has been reported by MacDiarmid et al., and according to this method, aniline monomers dissolved in hydrochloric acid with oxidizing agents such as ammonium persulfate are polymerized in an aqueous solution and the precipitates are separated and washed. Polyaniline prepared using hydrochloric acid as a dopant as such has an electrical conductivity of about 5 S/cm. (Non-Patent Document 1).

Recently, there has been reported a preparation method of water-soluble polyaniline using a polymer with an acid group as a dopant, and the polyaniline has a low electrical conductivity of about $10^{-2}$ to $10^{-4}$ S/cm (Patent Document 1).

Meanwhile, there have been conducted various studies to improve electrical conductivities of organic conducting polymers. Generally, an electrical conductivity of a solid varies depending on a band gap between a valence band and a conduction band. As for an insulator, an energy gap between a valence band and a conduction band is high, and, thus, even if an electron is excited, it cannot go up to the valence band. However, as for a metal, there is no band gap, and, thus, an electron can freely move between the two bands. Further, if there is a band gap between them, an electron in the valence band is excited into the conduction band by thermal energy in crystal and leaves a positive hole behind the valence band. A substance having such a property refers to "semiconductor".

Generally, an organic conducting polymer has a unique HOMO/LUMO level according to its chemical structure and size, and an energy band gap can be regulated by modifying such a chemical structure and size. Based on this fact, various studies regarding conducting polymers having a low band gap are conducted. However, an organic conducting polymer of which a band gap level can be substantially regulated with ease has not yet been developed.

Therefore, it is urgently demanded to develop doped polyaniline which can be improved in solubility and also regulated in a band gap energy level of polyaniline.

Prior Art Document

[Patent Document]
U.S. Pat. No. 6,010,645
[Non-Patent Document]
MacDiarmid et al. Conducting polymers, 105, (1987)

SUMMARY OF THE INVENTION

An object of the present application is to provide polyaniline coordinated with a transition metal.

Another object of the present application is to provide a core-shell nanoparticle including the polyaniline as a core.

Further, yet another object of the present application is to provide a preparation method of the polyaniline coordinated with a transition metal.

Also, yet still another object of the present application is to provide a preparation method of the core-shell nanoparticle including the polyaniline as a core.

To achieve the above-described objects, in an exemplary embodiment of the present application, there is provided polyaniline coordinated with a transition metal.

Further, in an exemplary embodiment of the present application, there is provided a nanoparticle including: a core including the polyaniline coordinated with a transition metal; and a shell formed of at least one selected from the group consisting of silica, polystyrene, polysorbate 80 (Tween 80), polyvinylpyrrolidone (PVP), and octyl phenol ethoxylate (Triton X-100) on a surface of the core.

Furthermore, in an exemplary embodiment of the present application, there is provided a preparation method of polyaniline coordinated with a transition metal from a mixture of an aqueous hydracid solution in which aniline monomers are dissolved and an oxidizing agent including the transition metal.

Moreover, in an exemplary embodiment of the present application, there is provided a preparation method of a nanoparticle including: a step of preparing an oxidizing agent having a core-shell structure coated with a silica shell from a mixture of an oxidizing agent including a transition metal and a silica precursor; and a step of preparing a nanoparticle including polyaniline coordinated with a transition metal as a core within a silica shell by mixing the oxidizing agent having a core-shell structure and an aqueous hydracid solution in which aniline monomers are dissolved.

According to the polyaniline coordinated with a transition metal and the nanoparticle of the present application, it is possible to prepare polyaniline coordinated with a transition metal using an oxidizing agent having a core-shell structure and including the transition metal and a nanoparticle including the same as a core. The polyaniline prepared as such is in a doped state, and, thus, a preparation process is simple. Further, dispersibility with respect to a solvent is improved, and a band gap level of the polyaniline can be easily regulated.

BRIEF DESCRIPTION OF THE DRAWINGS

FIG. 2 provides scanning electron microscopic images of nanoparticles of polyaniline coordinated with $Mn^{2+}$ in an exemplary embodiment according to the present application: herein, FIG. 2A are images of a nano-sized MnO oxidizing agent, FIG. 2B are images of silica-coated MnO, FIG. 2C are images of nanoparticles including polyaniline coordinated with $Mn^{2+}$, and I are images according to Example 1, II are images according to Example 2, III are images according to Example 3, and IV are images according to Example 4;

FIG. 3 provides images each illustrating a change in color of polyaniline depending on a size of MnO used in polymerization of polyaniline and pH in an exemplary embodiment: herein.

DETAILED DESCRIPTION OF EXEMPLARY EMBODIMENTS

The present application can be modified and changed in various ways and can be embodied in various forms, and thus, the present application will now be described in detail with reference to the accompanying drawings, in which exemplary embodiments of the invention are illustrated.

However, it should be noted that the present application is not limited to the exemplary embodiments, but all modifications, equivalents, or substitutes within the spirit and scope of the present application will be construed as being included in the present application.

In the present application, it will be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The elements illustrated in the accompanying drawings may be enlarged or contracted for convenience of explanation.

Hereinafter, the present application will be described in detail with reference to the accompanying drawings, and the identical or corresponding elements will be assigned the same reference numerals, regardless of the figure number, and any redundant description of the identical or corresponding elements will be omitted.

In the present application, the term "nanoparticle" refers to a particle having a size of 1 nm to several tens of μm and includes any form of a nanoparticle, nanopowder, a nanorod, a nanotube, and the like.

Further, in the present application, the term "conductive doping point" or "doping point" refers to a pH critical value at which polyaniline or a particle including the same has conductivity.

The present application provides polyaniline coordinated with a transition metal, a core-shell nanoparticle including the same as a core, and preparation methods thereof.

Polyaniline has attracted attention since it requires a relatively low manufacturing cost and is chemically stable and excellent in processability as compared with other conducting polymers. However, as for polyaniline prepared according to a conventional method, it is difficult to regulate a band gap energy level and solvents capable of dissolving the polyaniline are limited. Further, the prepared polyaniline is in a de-doped state. Therefore, in order to use the polyaniline as a conducting polymer, it is cumbersome to convert the state into a doped state, and in order to convert the state into a doped state, a strong acid treatment needs to be performed after polymerization of polyaniline, and, thus, it is dangerous in operation.

In order to overcome such problems, the present application suggests polyaniline coordinated with a transition metal, a core-shell nanoparticle including the same as a core, and preparation methods thereof.

According to the polyaniline and the nanoparticle including the same as a core of the present application, it is possible to prepare polyaniline coordinated with a transition metal in a shell using an oxidizing agent having a core-shell structure and including the transition metal and a nanoparticle including the same as a core. The polyaniline prepared as such is in a doped state, and, thus, a preparation process is simple. Further, dispersibility with respect to a solvent is improved, and a band gap level of the polyaniline can be easily regulated.

Hereinafter, the present application will be described in more detail.

In an exemplary embodiment of the present application, there is provided polyaniline coordinated with a transition metal.

According to the present application, polyaniline has a structure in which polyaniline is coordinated with a transition metal, and, thus, solubility with respect to a solvent is excellent and a band gap level of the polyaniline can be regulated through coordination with a transition metal. To be more specific, it is easy to regulate a band gap level of the polyaniline according to a concentration of the transition metal with which the polyaniline is coordinated.

Herein, according to the present application, the transition metal is not particularly limited as long as it is a transition metal having a divalent positive ion. To be specific, the transition metal may include $Mn^{2+}$ and $Fe^{2+}$.

According to the present application, a doping point of the polyaniline may satisfy a condition of the following equation 1 with respect to a concentration of the transition metal included in 2 mg of the polyaniline:

$$pH = a_1 M + b_1 \qquad \text{[Equation 1]}$$

wherein pH is a doping point of the polyaniline, $a_1$ and $b_1$ satisfy $0.001 \le a_1 \le 0.01$ and $2.5 \le b_1 \le 5$, respectively, and M is a concentration of the transition metal ($Mn^{2+}$ or $Fe^{2+}$) with respect to the polyaniline and a unit of the concentration is μg/mL.

Figure 4:
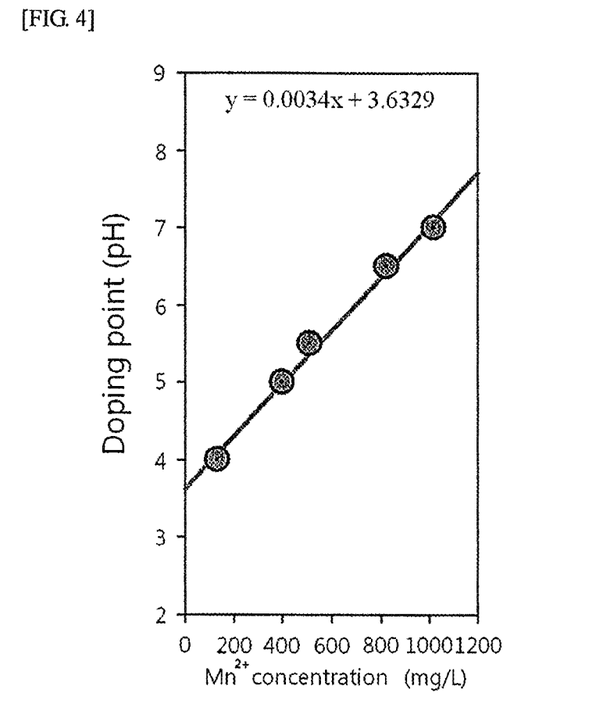
FIG. 4 is a graph illustrating a doping point (pH) depending on a concentration of $Mn^{2+}$ in a polyaniline nanoparticle in an exemplary embodiment.

Referring to FIG. 3 and FIG. 4, in an exemplary embodiment of the present application, polyaniline was prepared using MnO coated with silica shells of 15 nm, 18 nm, 24 nm, and 40 nm as an oxidizing agent, and the prepared polyaniline (2 mg) was dispersed in solutions respectively having a pH of 1 to 12. Then, a doping point (pH) of the conducting polyaniline was measured according to a change in color of the prepared dispersion solution. As a result, it can be seen that as a size of the MnO used in polymerization of polyaniline increases, a concentration of the MnO in a silica shell serving as a support is regulated, and according to this concentration, a concentration of $Mn^{2+}$ with which the polyaniline polymerized in the silica shell is coordinated is also regulated.

To be more specific, it can be seen that the polyaniline according to the present application is prepared as being doped with sulfuric acid during polymerization, and, thus, when a concentration of $Mn^{2+}$ is 0, a doping point (pH) of the polyaniline is about 3.6. Further, it can be seen that as the concentration of $Mn^{2+}$ is increased to 134 μg/mL, 399 μg/mL, 512 μg/mL, 825 μg/mL, and 1029 μg/mL, the doping point (pH) is increased by about 1. Such a relationship between the doping point (pH) of polyaniline and the concentration of $Mn^{2+}$ with which the polyaniline is coordinated may satisfy the above equation 1.

Further, in the polyaniline according to the present application, when absorbance is measured at a wavelength of 570 nm and a wavelength of 770 nm, a doping point of the polyaniline and a ratio of the absorbance at 570 nm to the absorbance at 770 nm may satisfy a condition of the following equation 2:

$$\lambda_{570}/\lambda_{770} = a_2(pH) + b_2 \quad \text{[Equation 2]}$$

wherein pH is a doping point of the polyaniline, $a_2$ and $b_2$ satisfy $0.16 \leq a_2 \leq 0.18$ and $0.25 \leq b_2 \leq 0.35$, respectively, $\lambda_{570}$ is absorbance at a wavelength of 570 nm, and $\lambda_{770}$ is absorbance at a wavelength of 770 nm.

Figure 5:
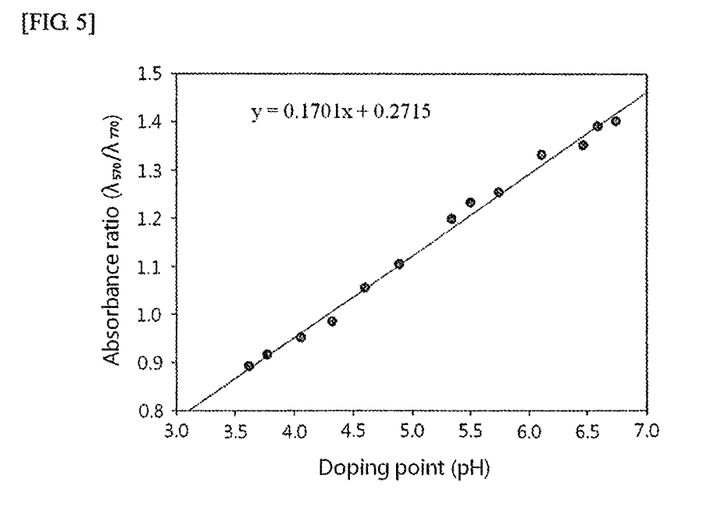
FIG. 5 is a graph illustrating a ratio of absorbance at a wavelength of 570 nm to absorbance at a wavelength of 770 nm depending on a doping point (pH) of polyaniline in an exemplary embodiment.

Referring to FIG. 5, it can be seen that polyaniline coordinated with $Mn^{2+}$ in an exemplary embodiment of the present application can be regulated in a band gap energy level.

To be more specific, in the polyaniline according to the present application, as a size of MnO having a core-shell structure used in polymerization of polyaniline increases, a doping point (pH) of the polyaniline increases, and, thus, a ratio of absorbance at a wavelength of 570 nm to absorbance at a wavelength of 770 nm also increases. This means that as a concentration of $Mn^{2+}$ with which the polyaniline is coordinated increases, a band gap energy level of the polyaniline decreases, and, thus, the ratio of absorbance at a wavelength of 570 nm to absorbance at a wavelength of 770 nm increases. Therefore, a relationship between the doping point (pH) of polyaniline and the ratio of absorbance at a wavelength of 570 nm to absorbance at a wavelength of 770 nm may satisfy the above equation 2.

Further, in an exemplary embodiment of the present application, there is provided a nanoparticle (hereinafter, referred to as "polyaniline nanoparticle") including: a core including the polyaniline coordinated with a transition metal; and a shell formed of at least one selected from the group consisting of silica, polystyrene, polysorbate 80 (Tween 80), polyvinylpyrrolidone (PVP), and octyl phenol ethoxylate (Triton X-100) on a surface of the core.

FIG. 1 is a diagram illustrating elements of the polyaniline nanoparticle according to the present application.

Figure 1A:
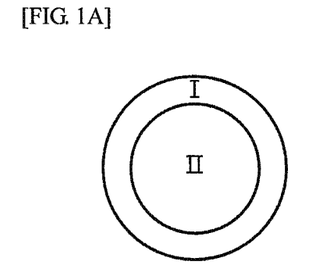
FIG. 1A and FIG. 1B is are a schematic diagram illustrating a structure of a nanoparticle including polyaniline coordinated with a transition metal as a core according to the present application: herein, I: a support, II: polyaniline coordinated with a transition metal, and III: a hollow.

Referring to FIG. 1A, the polyaniline nanoparticle according to the present application may have a structure in which polyaniline II coordinated with a transition metal as a core is coated with a shell I formed of silica, polystyrene, and the like.

Figure 1B:
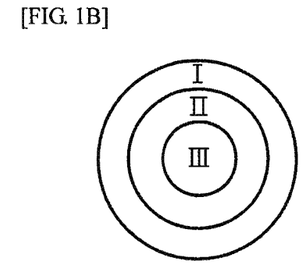

Further, as illustrated in FIG. 1B, the polyaniline nanoparticle may have a structure in which a shell I formed of silica, polystyrene, and the like, is coated on polyaniline II as a core, and the core further includes a hollow III.

Moreover, in an exemplary embodiment of the present application, there is provided a preparation method of polyaniline coordinated with a transition metal from a mixture of an aqueous hydracid solution in which aniline monomers are dissolved and an oxidizing agent including the transition metal.

To be more specific, in the preparation method of polyaniline according to the present application, the mixture of aniline monomers dissolved in an aqueous hydracid solution serving as a dopant and an oxidizing agent including a transition metal is polymerized, so that doped polyaniline, which is coordinated with the transition metal ($Mn^{2+}$ or $Fe^{2+}$) derived from the oxidizing agent, can be prepared.

Herein, the oxidizing agent is not particularly limited as long as it includes Mn or Fe, and more specifically, it generates $Mn^{2+}$ or $Fe^{2+}$ during polymerization. Examples of the oxidizing agent which can be applied to the present application may include MnO, $Mn_3O_4$, $MnO_2$, and the like for generating $Mn^{2+}$ and FeO and $Fe_3O_4$ for generating $Fe^{2+}$.

Further, the aqueous hydracid solution according to the present application is used as a dopant for doping the prepared polyaniline and a reaction solvent. To be specific, examples of the aqueous hydracid solution which can be applied to the present application may include an aqueous solution in which at least one inorganic acid selected from the group consisting of sulfuric acid, hydrochloric acid, nitric acid, and phosphoric acid is mixed with water at a ratio of 1:5 to 15 (v/v). To be more specific, sulfuric acid may be mixed with water at 1:9 to 11 (v/v).

In addition, in an exemplary embodiment of the present application, there is provided a preparation method of a nanoparticle including: a step of preparing an oxidizing agent having a core-shell structure coated with a silica shell from a mixture of an oxidizing agent including a transition metal and a silica precursor; and a step of preparing a nanoparticle including polyaniline coordinated with a transition metal as a core within a silica shell by mixing the oxidizing agent having a core-shell structure and an aqueous hydracid solution in which aniline monomers are dissolved.

Hereinafter, each step of the preparation method of a nanoparticle according to the present application will be described in detail.

In the step of preparing an oxidizing agent having a core-shell structure according to the present application, before polymerization of polyaniline is performed, a silica shell is formed on a surface of the oxidizing agent including a transition metal ($Mn^{2+}$ or $Fe^{2+}$) using the silica precursor, thereby inducing a core-shell structure of the oxidizing agent.

Herein, since the polymerization of polyaniline is performed within the silica shell, the silica shell should not be deformed under a condition for polymerization of polyaniline. The silica precursor, which can be used for forming the silica shell, may include, for example, tetraethyl orthosilicate (TEOS), but is not limited thereto.

Further, a size of the oxidizing agent in which the silica shell is formed is the same as a size of the prepared polyaniline nanoparticle. Thus, a size of the oxidizing agent can be regulated in consideration of a use of the prepared polyaniline nanoparticle. To be specific, the oxidizing agent may have a size in a range of 5 nm to 200 nm, more specifically, 5 nm to 100 nm; 5 nm to 60 nm; 10 nm to 150 nm; 10 nm to 100 nm; 10 nm to 80 nm; or 10 nm to 60 nm, but is not limited thereto.

Then, in the step of preparing a nanoparticle according to the present application, the aqueous hydracid solution in which aniline monomers are dissolved and the oxidizing agent coated with a silica shell are mixed, and polymerization according to the following reaction formula 1 and a reaction according to the following reaction formula 2 or reaction formula 3 are conducted within the silica shell, so that a core-shell nanoparticle including polyaniline coordinated with a transition metal ($Mn^{2+}$ or $Fe^{2+}$) within the silica shell is prepared.

$$C_6H_5NH_2 \rightarrow C_6H_4NH \quad \text{[Reaction Formula 1]}$$

$$MnO + 2H^+ \rightarrow Mn^{2+} + H_2O \quad \text{[Reaction Formula 2]}$$

$$Fe_3O_4 + 8H^+ \rightarrow 3Fe^{2+} + 4H_2O \quad \text{[Reaction Formula 3]}$$

Herein, the mixture of the aniline monomers and the oxidizing agent is dissolved in the aqueous hydracid solution serving as a dopant, and, thus, the nanoparticle prepared by polymerization may include doped polyaniline as a core.

Figure 2A:
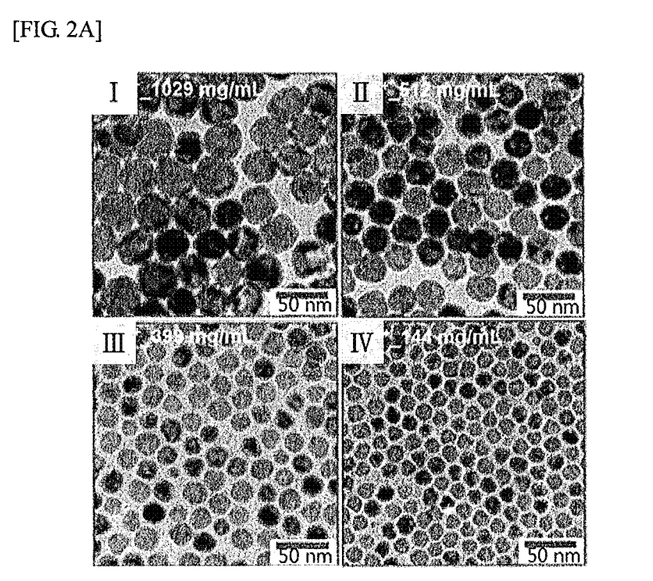
Figure 2B:
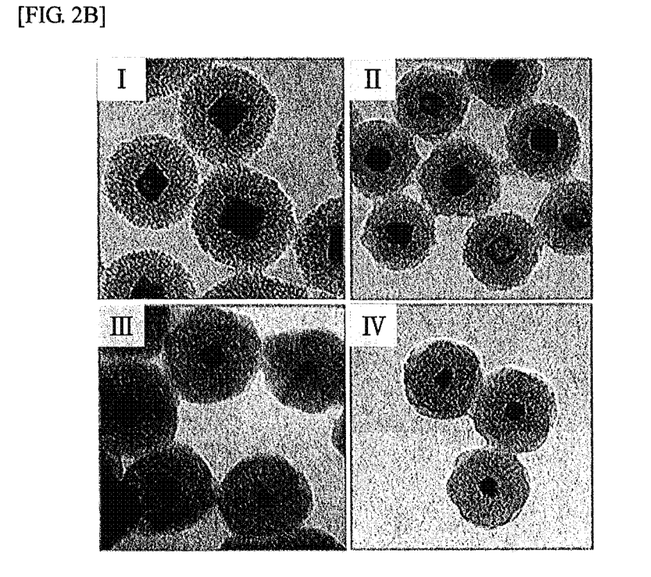
Figure 2C:
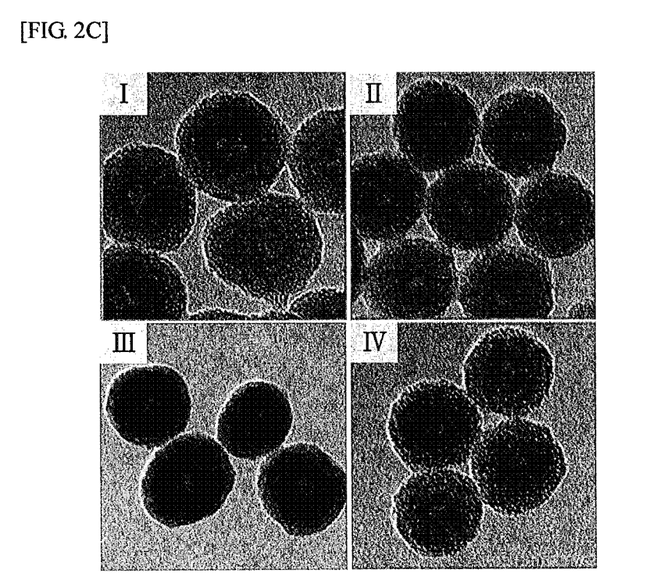
Figure 3A:
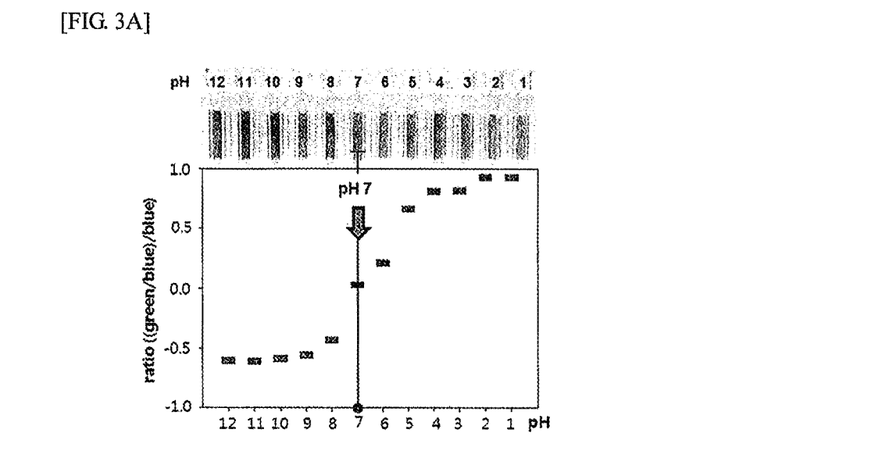
FIG. 3A illustrates a case where MnO of 40 nm is used.
Figure 3B:
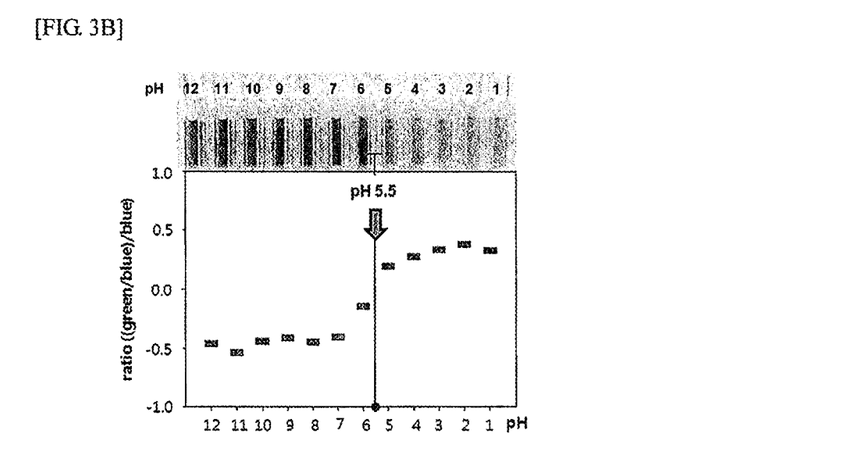
FIG. 3B illustrates a case where MnO of 24 nm is used.
Figure 3C:
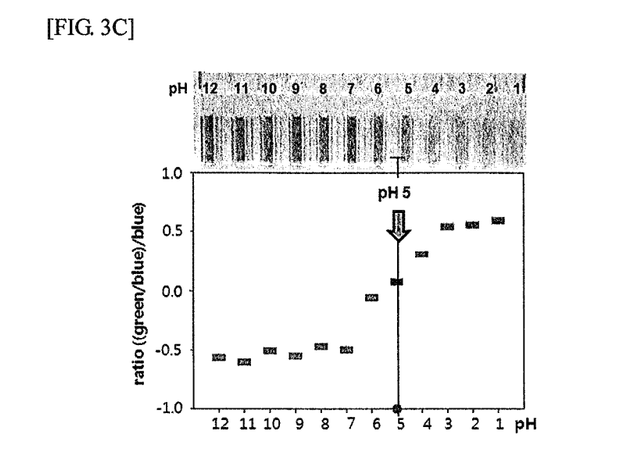
FIG. 3C illustrates a case where MnO of 18 nm is used.
Figure 3D:
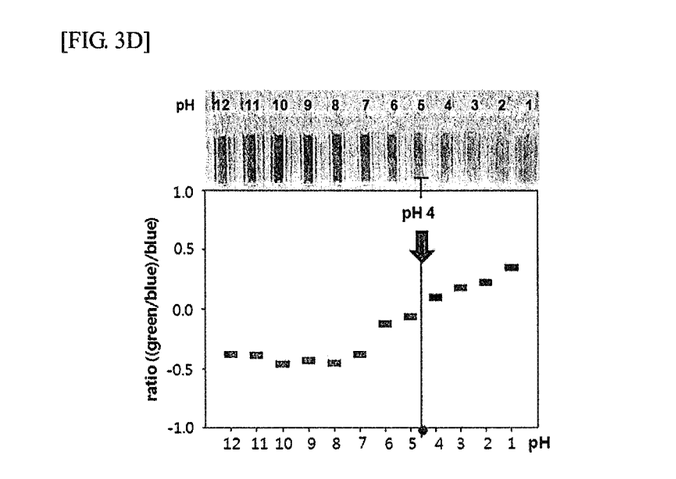
FIG. 3D illustrates a case where MnO of 15 nm is used.

Referring to FIG. 2, it can be seen that in an exemplary embodiment of the present application, a nanoparticle includes, as a core, polyaniline which is polymerized within a silica shell coating MnO used as an oxidizing agent and then coordinated with $Mn^{2+}$ derived from the oxidizing agent.

Further, referring to FIG. 4, it can be seen that a solution, in which the nanoparticle prepared according to the present application is dispersed, is green or blue. This means that an emeraldine base or an emeraldine salt as a doped form of polyaniline is produced.

Therefore, it can be seen that by the preparation method according to the present application, a nanoparticle including polyaniline coordinated with a transition metal ($Mn^{2+}$ or $Fe^{2+}$) within a silica shell in a doped state as a core is prepared.

Further, the preparation method of a nanoparticle according to the present application may further include a step of purifying the nanoparticle by way of centrifugation after the step of preparing a nanoparticle by mixing an aqueous hydracid solution in which aniline monomers are dissolved and an oxidizing agent coated with silica.

To be more specific, in the preparation method of a nanoparticle according to the present application, after the step of preparing a nanoparticle including polyaniline as a core, a supernatant is removed by way of centrifugation, thereby removing the aqueous hydracid solution. Further, a washing process, in which distilled water is added and mixed with a precipitate from which the aqueous hydracid solution is removed by way of centrifugation and a supernatant is removed by way of recentrifugation, is repeatedly performed several times, so that a high-purity polyaniline nanoparticle from which remaining hydracid is removed can be obtained.

Hereinafter, the present application will be explained in more detail with reference to Examples and Experimental Examples.

However, the following examples and experimental examples are provided only for illustration of the present application but not intended to limit the present application.

Example 1

100 μL of tetraethyl orthosilicate (TEOS) was drop wise added to MnO (1029 mg/mL) of 40 nm to be used as an oxidizing agent at a speed of 40 μL/hr to coat MnO with silica. Then, the coated MnO and aniline monomers (66 μL) were drop wise added to a sulfuric acid aqueous solution. Herein, the aniline monomers, the sulfuric acid, and the water were mixed at a volume ratio of 1:2:20. The solution was vortexed for 30 minutes and centrifugated, so that a polyaniline nanoparticle of 100 nm coordinated with purified $Mn^{2+}$ was obtained.

Example 2

A polyaniline nanoparticle coordinated with $Mn^{2+}$ was obtained in the same manner as Example 1 except that MnO of 24 nm was used instead of MnO of 40 nm used in Example 1. Herein, a size of the obtained polyaniline nanoparticle had the same size as the nanoparticle of Example 1.

Example 3

A polyaniline nanoparticle coordinated with $Mn^{2+}$ was obtained in the same manner as Example 1 except that MnO of 18 nm was used instead of MnO of 40 nm used in Example 1. Herein, a size of the obtained polyaniline nanoparticle had the same size as the nanoparticle of Example 1.

Example 4

A polyaniline nanoparticle coordinated with $Mn^{2+}$ was obtained in the same manner as Example 1 except that MnO of 15 nm was used instead of MnO of 40 nm used in Example 1. Herein, a size of the obtained polyaniline nanoparticle had the same size as the nanoparticle of Example 1.

Experimental Example 1

In order to evaluate a doping point (pH) of prepared polyaniline depending on a size of a core-shell oxidizing agent used in polymerization of the polyaniline according to the present application, an experiment was conducted as described below.

Firstly, 12 kinds of pH solutions respectively having pH1 to pH12 were prepared at room temperature using a pH meter (Horiba F-53, Horiba Co., Ltd.), and the polyaniline nanoparticles (2 mg) of Example 1 to Example 4, in which the oxidizing agents used in polymerization were different in size, were dispersed in each of the 12 kinds of pH solutions (1 mL). After the prepared polyaniline nanoparticle dispersion solutions were stabilized for 12 hours, colors of the dispersion solutions were evaluated with the naked eye, and doping points (pH) of the dispersion solutions were measured with a UV spectrum (OPTIZEN 2120UV, Mecasys). From the measured values, an aspect of change in doping point (pH) depending on a size of the oxidizing agent used in preparation of the nanoparticle, i.e. a concentration of $Mn^{2+}$, was derived. Herein, it was evaluated that if a color of the dispersion solution is blue, conductivity of polyaniline is not realized, and if a color of the dispersion solution is green, conductivity of polyaniline is realized. Further, as the doping point (pH) of polyaniline, a point where a color of the dispersion solution was changed from green to blue was measured. A result thereof was as illustrated in FIG. 2 to FIG. 4.

As illustrated in FIG. 2 to FIG. 4, it can be seen that in the polyaniline coordinated with a transition metal ($Mn^{2+}$ or $Fe^{2+}$) according to the present application, a doping point (pH) increases as a size of MnO used in polymerization of the polyaniline increases.

To be more specific, referring to FIG. 2, it can be seen that the polyaniline nanoparticle is uniformly dispersed within the solution and polymerized and coordinated with $Mn^{2+}$ within a silica shell with which MnO is coated. Further, it can be seen that although sizes of MnO are different, if sizes of the oxidizing agents are regulated such that sizes of the final oxidizing agent coated with silica are identical to each other, concentrations of MnO in the silica shells can be regulated according to the sizes of MnO included as a core, and, thus, concentrations of $Mn^{2+}$ with which polyaniline polymerized within the silica shells are coordinated can also be regulated.

Further, referring to FIG. 3, it can be seen that when the polyaniline according to the present application is dispersed in each of the solutions having pH1 to pH12, a color of the solution is green or blue. This means that an emeraldine base or an emeraldine salt as a doped form of polyaniline is produced.

Furthermore, with reference to the measured pH values of polyaniline with respect to the dispersion solutions, it can be seen that as a pH increases, a color of the solution is blue, and as a pH decreases, a color of the solution is green. This is an electrochromic phenomenon in which as a pH decreases, a blue emeraldine base is oxidized and converted into a green emeraldine salt, and means that as a concentration of $Mn^{2+}$ increases, its chromic point, i.e., a conductive doping point (pH), increases.

Also, referring to FIG. 4, in polymerization of polyaniline, the polyaniline is prepared as being doped with sulfuric acid, and, thus, it can be seen that when a concentration of $Mn^{2+}$ is 0, a doping point (pH) of the polyaniline is about 3.6, and as a concentration of $Mn^{2+}$ is increased to 134 μg/mL, 399 μg/mL, 512 μg/mL, 825 μg/mL, and 1029 μg/mL, a doping point (pH) is increased by 1.

From the above-described result, it can be seen that the polyaniline nanoparticle according to the present application is dispersed well in water, and the dispersed polyaniline has a structure in which the polyaniline is coordinated with a transition metal ($Mn^{2+}$ or $Fe^{2+}$) within a silica shell. Further, it can be seen that as a concentration of the transition metal ($Mn^{2+}$ or $Fe^{2+}$) with which the polyaniline is coordinated is increased, a doping point (pH) of the prepared polyaniline is also increased.

Experimental Example 2

In order to confirm whether a band gap energy level of polyaniline coordinated with a transition metal according to the present application is regulated or not, an experiment was conducted as described below.

After the polyaniline nanoparticles of Example 1 to Example 4 according to the present application were dispersed in water, absorbance at a wavelength of 570 nm and a wavelength of 770 nm was measured with a UV spectrum (OPTIZEN 2120UV, Mecasys) in addition to doping points (pH) of the dispersion solutions. The measured values were as illustrated in FIG. 5.

As illustrated in FIG. 5, it can be seen that a band gap energy level of polyaniline coordinated with a transition metal ($Mn^{2+}$ or $Fe^{2+}$) according to the present application is regulated.

To be more specific, in the dispersion solutions in which the polyaniline nanoparticles of Example 1 to Example 4 according to the present application were dispersed, respectively, as a size of MnO used in polymerization is increased, a doping point (pH) of the dispersion solution is increased, and as the doping point (pH) is increased, a ratio of absorbance at a wavelength of 570 nm to absorbance at a wavelength of 770 nm is increased. This means that as a concentration of $Mn^{2+}$ with which polyaniline is coordinated is increased, a band gap energy level of polyaniline is decreased, and, thus, a ratio of absorbance at a wavelength of 570 nm to absorbance at a wavelength of 770 nm increased.

Therefore, it can be seen that since polyaniline according to the present application is coordinated with a transition metal ($Mn^{2+}$ or $Fe^{2+}$), it is easy to regulate a band gap energy level of polyaniline.

What is claimed is:

1. A nanoparticle comprising:
    a core including polyaniline coordinated with $Mn^{2+}$, the polyaniline is doped with hydracids which include at least one inorganic acid selected from the group consisting of sulfuric acid, hydrochloric acid, nitric acid, and phosphoric acid,
    wherein the polyaniline has a doping point which satisfies a condition of the following equation 1 with respect to a concentration of $Mn^{2+}$ included in 2 mg of the polyaniline; and
    a shell formed of at least one selected from the group consisting of silica, polystyrene, polysorbate 80, polyvinyl pyrrolidone (PVP) and octyl phenol ethoxylate on a surface of the core:

$$pH = a_1 M + b_1 \quad \text{[Equation 1]}$$

wherein pH is a doping point of the polyaniline, $a_1$ and $b_1$ satisfy $0.001 \leq a_1 \leq 0.01$ and $2.5 \leq b_1 \leq 5$, respectively, and M is a concentration of $Mn^{2+}$ and has a range of 134 μg/mL to 1029 μg/mL.

2. The nanoparticle of claim 1, wherein when absorbance is measured at a wavelength of 570 nm and a wavelength of 770 nm, the doping point of the polyaniline and a ratio of the absorbance at 570 nm to the absorbance at 770 nm satisfy a condition of the following equation 2:

$$\lambda_{570}/\lambda_{770} = a_2(pH) + b_2 \quad \text{[Equation 2]}$$

wherein pH is the doping point of the polyaniline, $a_2$ and $b_2$ satisfy $0.16 \leq a_2 \leq 0.18$ and $0.25 \leq b_2 \leq 0.35$, respectively, $\lambda_{570}$ is absorbance at a wavelength of 570 nm, and $\lambda_{770}$ is absorbance at a wavelength of 770 nm.

3. The nanoparticle of claim 1, wherein the core including polyaniline further includes a hollow formed within the core.

* * * * *